(12) United States Patent
Herinckx et al.

(10) Patent No.: US 11,325,566 B2
(45) Date of Patent: May 10, 2022

(54) WIPER BLADE PACKAGING DEVICE

(71) Applicant: Robert Bosch GmbH, Stuttgart (DE)

(72) Inventors: Dirk Herinckx, Dries-Linter (BE); Erika Aleman, Herent (BE); Hans Beelen, Herk de Stad (BE); Vera Ausloos, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 16/063,669

(22) PCT Filed: Dec. 2, 2016

(86) PCT No.: PCT/EP2016/079535
§ 371 (c)(1),
(2) Date: Jun. 18, 2018

(87) PCT Pub. No.: WO2017/102372
PCT Pub. Date: Jun. 22, 2017

(65) Prior Publication Data
US 2020/0282955 A1 Sep. 10, 2020

(30) Foreign Application Priority Data
Dec. 18, 2015 (DE) .......................... 102015225945.5

(51) Int. Cl.
*B65D 25/10* (2006.01)
*B60S 1/38* (2006.01)

(52) U.S. Cl.
CPC .......... *B60S 1/3848* (2013.01); *B65D 25/108* (2013.01); *B60S 2001/3843* (2013.01); *B60S 2001/3898* (2013.01)

(58) Field of Classification Search
CPC .................................................... B65D 25/108
USPC .................................................. 206/443, 446
See application file for complete search history.

(56) References Cited

U.S. PATENT DOCUMENTS

| 2,008,335 | A | * | 7/1935 | Nuyts | ................ | B65D 5/48038 |
| | | | | | | 206/528 |
| 3,192,680 | A | * | 7/1965 | Mantell | .................. | B65D 77/02 |
| | | | | | | 53/449 |
| 4,133,427 | A | * | 1/1979 | Loomis | .................. | B65D 85/20 |
| | | | | | | 206/317 |

(Continued)

FOREIGN PATENT DOCUMENTS

DE 102012210885 A1 1/2014

OTHER PUBLICATIONS

International Search Report with English translation and Written Opinion for Application No. PCT/EP2016/079535 dated Jan. 31, 2017 (10 pages).

*Primary Examiner* — Jacob K Ackun
(74) *Attorney, Agent, or Firm* — Michael Best & Friedrich LLP

(57) ABSTRACT

The invention relates to a wiper blade packaging device having at least one secondary packaging (10*a*; 10*b*), which is provided to receive at least one wiper blade (12*a*; 12*b*), and having at least one mounting element (16*a*; 16*b*), which is arranged in the secondary packaging (10*a*; 10*b*) in at least one packaged state and which is provided to mount the wiper blade (12*a*; 12*b*) at least in part. According to the invention, in the packaged state, the mounting element (16*a*; 16*b*) is provided in order to be penetrated by the wiper blade (12*a*; 12*b*).

14 Claims, 4 Drawing Sheets

(56) References Cited

U.S. PATENT DOCUMENTS

| | | | | |
|---|---|---|---|---|
| 5,358,116 A | * | 10/1994 | Brintazzoli | B65D 5/5061 |
| | | | | 206/485 |
| 2013/0327665 A1 | * | 12/2013 | Jehannet | B65D 85/54 |
| | | | | 206/372 |
| 2014/0360914 A1 | * | 12/2014 | Denney | B65D 81/055 |
| | | | | 206/583 |
| 2015/0158626 A1 | * | 6/2015 | Herinckx | B65D 5/445 |
| | | | | 206/335 |

* cited by examiner

WIPER BLADE PACKAGING DEVICE

BACKGROUND OF THE INVENTION

A wiper blade packaging having a secondary packaging and a mounting element which is provided for mounting a wiper blade in an interior space of the wiper blade packaging has already been proposed, in particular having a mounting element with a clearance in the shape of part of the wiper blade into which the wiper blade can be longitudinally placed.

SUMMARY OF THE INVENTION

The invention proceeds from a wiper blade packaging device having at least one secondary packaging which is provided for receiving at least one wiper blade, and having at least one mounting element that at least in a packaged state is disposed in the secondary packaging, said mounting element being provided for at least partially mounting the wiper blade.

It is proposed that the wiper blade in the packaged state penetrates the mounting element.

A "wiper blade packaging device" in this context is to be understood in particular to be at least part, in particular a sub-group of components, of a wiper blade packaging, in particular of a flat wiper blade packaging. The wiper blade packaging device can in particular also comprise the entire wiper blade packaging, in particular the entire flat wiper blade packaging. Alternatively or additionally, a wiper blade packaging device is to be understood to be a construction kit for a wiper blade packaging, in particular a flat wiper blade packaging. In particular, the secondary packaging can be provided for in particular simultaneously receiving at least two, advantageously exactly two, wiper blades, in particular flat wiper blades. In the present case, the wiper blade herein corresponds to a packaging element. A "packaging element" in this context is to be understood to be in particular an element to be packaged and/or a packaged element, in particular in a shipping and/or transportation state. The secondary packaging, conjointly with an interior space that is enclosed by the secondary packing, is preferably at least substantially cuboid. Particularly preferably, the interior space that is enclosed by the secondary packaging is at least substantially cuboid. An "at least substantially cuboid object" herein is to be understood in particular to be an object with the property of a volumetric differential between the object and a smallest cuboid that surrounds the object is at maximum 30%, advantageously at maximum 20%, particularly advantageously at maximum 10%, and preferably at maximum 5% of the volume of the cuboid.

A "mounting element" is furthermore to be understood to be in particular an element which is in particular configured separately and/or so as to be separate from the secondary packaging and which in particular has at least one bearing face for bearing the wiper blade, in particular at least a component of the wiper blade such as, for example, a wiper strip, a wiper lip, a spring rail, and/or a wind deflector element. The mounting element can in particular be provided for at least partially mounting at least two, advantageously exactly two, wiper blades. The mounting element, in particular at least conjointly with the secondary packaging, is preferably provided for stretching the wiper blade. The mounting element is advantageously at least largely composed of a plastic material, in particular of a rigid plastic material. However, it is also conceivable for the mounting element to be composed of a cardboard and/or a paperboard. The term "at least largely" herein is to be understood in particular to an extent of at least 55%, advantageously at least 65%, preferably at least 75%, particularly preferably at least 85%, and particularly advantageously at least 95%.

A first object "penetrating" a second object is to be understood in particular as meaning that the first object in at least one view runs through the second object and in portions within the second object. In particular, there is at least one plane in the case of which in a perpendicular projection of the first object and of the second object onto the plane a projection of the first object intersects a projection of the second object in such a manner that the projection of the first object on at least one side runs into the projection of the second object, and on at least one other, in particular opposite, side runs out of the projection of the second object.

An efficiency, in particular a production efficiency, a manufacturing efficiency, an installation space efficiency, and/or a cost efficiency, can be improved in particular by a corresponding design embodiment of the wiper blade packaging device. Furthermore, an advantageous mounting of a packaged wiper blade can be achieved. In particular, a mounting element that can be manufactured and/or assembled in a cost-effective and/or simple manner can be provided. A protective packaging of a wiper blade can advantageously be provided, in particular with a view to an integrity of a wiper lip. Furthermore, two wiper blades can advantageously be mounted in one packaging. Furthermore, a rapid insertion of a mounted wiper blade into a packaging can be advantageously enabled. Moreover, a wiper blade can be advantageously packaged in a space-saving manner. In particular, a retrieval of a wiper blade from a packaging can be advantageously facilitated. Moreover, a particularly flexible wiper blade packaging device can be provided.

In one advantageous design embodiment of the invention it is proposed that the mounting element defines at least one first wiper blade receptacle opening which is provided for at least partially receiving the wiper blade and for holding in a non-contacting manner a wiper lip of the wiper blade. The wiper blade in the packaged state preferably penetrates the wiper blade receptacle opening. A cross section of the wiper blade receptacle opening, in particular in a region of the wiper blade which in the packaged state penetrates the wiper blade receptacle opening, is advantageously at least partially adapted to a cross section of the wiper blade. The wiper blade in the packaged state is particularly preferably connected in an at least partially form-fitting manner to the mounting element, in particular in a region of the receptacle opening that is opposite the wiper lip. In the packaged state, a plane normal of a plane of the main extent of the wiper blade receptacle opening advantageously runs at least substantially parallel with direction of main extent of the wiper blade, A "plane of the main extent" of an object is to be understood in particular to be a plane which is parallel with a largest lateral face of a smallest imaginary cuboid which just still completely encloses the object, and in particular runs through the center of the cuboid. A "direction of main extent" of an object herein is to be understood in particular to be a direction which runs parallel with a longest edge of a smallest imaginary cuboid which just still completely encloses the object. "At least substantially parallel" herein is to be understood in particular to be an alignment of a direction relative to a reference direction, in particular in one plane, wherein the direction in relation to the reference direction has a deviation of in particular less than 8°, advantageously less than 5°, and particularly advantageously less than 2°. The wiper blade receptacle opening preferably has at least one wiper lip region which is provided for surrounding the wiper lip in the packaged state in such a manner that the wiper lip penetrates the mounting element in a non-contacting manner. The wiper blade receptacle opening particularly preferably has at least one wind deflector region which is provided for surrounding a wind deflector element of the wiper blade in the packaged state, and in particular for connecting the mounting element in an at least partially form-fitting manner to the wiper blade. On account thereof, any deformation of and/or damage to a wiper lip can be advantageously prevented. Furthermore, a reliable retention of a wiper blade can be achieved on account thereof.

In one particularly advantageous design embodiment of the invention it is proposed that the mounting element defines at least one second wiper blade receptacle opening which is provided for at least partially receiving at least one further wiper blade. The first wiper blade receptacle opening and the second wiper blade receptacle opening advantageously have cross sections which are at least substantially identical. "At least substantially identical cross sections" of two objects in this context is to be understood in particular as meaning that a minimum differential face which is formed by superimposing a cross section of the first object and a cross section of the second object has a surface area which deviates from a surface area of the cross section of the first object by at most 30%, advantageously at most 20%, particularly advantageously at most 10%, and preferably at most 5% of a surface area of the cross section of the first object. A plurality of, in particular two, wiper blades can be packaged conjointly, in particular in a space-saving manner, on account thereof.

In one preferred design embodiment of the invention it is proposed that the second wiper blade receptacle opening is configured so as to be at least substantially symmetrical in terms of axes and/or points in relation to the first wiper blade receptacle opening. The first wiper blade receptacle opening and the second wiper blade receptacle opening advantageously have in each case at least one wiper lip region which is provided for receiving a wiper lip of a wiper blade. The wiper lip regions particularly advantageously face in each case a symmetry axis and/or a symmetry center of the wiper blade receptacle openings. The first wiper blade receptacle opening and the second wiper blade receptacle opening preferably have in each case at least one wind deflector region which is provided for receiving a wind deflector element of a wiper blade. The wind deflector regions particularly preferably in each case face away from the symmetry axis and/or the symmetry center. A mounting element which is of simple construction and/or reliable in terms of function can advantageously be provided on account thereof. Furthermore, wiper lips of packaged wiper blades can be advantageously protected from shocks and/or deformations and/or damage on account thereof.

It is furthermore proposed that the mounting element in the assembled state along a direction of main extent of the secondary packaging has an extent which corresponds to at most 20%, advantageously at most 10%, particularly advantageously at most 5%, and preferably at most 3% of the extent of the secondary packaging along the direction of main extent of the secondary packaging. An "extent" of an object along a direction in this context is to be understood to be in particular a maximum spacing of two points along the direction of a perpendicular projection of the object onto a plane which is parallel with the direction. A mounting element which is cost-effective and/or efficient in terms of material and/or sustainable in terms of resources can be advantageously provided on account thereof. Furthermore, a manageability in terms of handling and/or manipulation, in particular during packaging, can be advantageously enhanced on account thereof.

It is moreover proposed that the mounting element in the packaged state is disposed in an at least partially form-fitting manner in the secondary packaging. In the packaged state, at least one outer side and/or at least one outer edge and/or at least one corner of the mounting element are/is advantageously connected in a form-fitting manner to the secondary packaging. In the packaged state, the area normal of the plane of the main extent of the mounting element particularly advantageously runs at least substantially parallel with the direction of main extent of the secondary packaging. The mounting element preferably has an encircling periphery which defines an external wall which in the packaged state is at least partially connected in a form-fitting manner to an internal wall of the secondary packaging. On account thereof, a position of a packaged wiper blade relative to a packaging can be advantageously fixed. Furthermore, a shock-safe and/or damage-safe mounting of a packaged wiper blade can be advantageously provided on account thereof.

It is advantageously proposed that in the packaged state an external contour of the mounting element at least substantially configures a parallelogram that is different from a rectangle. In particular, a projection of the mounting element onto the plane of the main extent of the mounting element has an external contour which at least substantially configures a parallelogram that is different from a rectangle. A contour "at least substantially" configuring a "geometrical figure" in this context is to be understood in particular as meaning that the contour runs entirely within an area, the points of the latter having a maximum spacing from an external contour of the geometrical figure, said maximum spacing corresponding to at most 10%, advantageously at most 5%, particularly advantageously at most 3%, and preferably at most 2% of a length of the contour. Canting of the mounting element can be advantageously avoided on account thereof, in particular during an insertion into the secondary packaging. Furthermore, a time-saving and/or cost-saving and/or efficient packaging procedure can be enabled on account thereof.

It is particularly advantageously proposed that the mounting element in the packaged state in each case in a region of an acute angle of the parallelogram contacts one of two diagonally opposite internal edges of the secondary packaging. The two internal edges of the secondary packaging advantageously run at least substantially parallel with the direction of main extent of the secondary packaging. Particularly advantageously, in the packaged state, proceeding from each of the two internal edges of the secondary packaging, in each case one external side of the mounting element contacts in each case one internal side of the secondary packaging. On account thereof, the mounting element can be advantageously fixed relative to the secondary packaging. Furthermore, a simple and/or rapid introduction of the mounting element into the secondary packaging can be enabled on account thereof.

It is furthermore proposed that in the packaged state a bearing side of the wiper lip points away from an acute angle of the parallelogram that is closer to the wiper lip. A "bearing side" of the wiper lip in this context is to be understood to be in particular a region of the wiper lip which when wiping is in direct contact with a face, in particular a windshield, to be wiped. In the packaged state, a wind deflector element of the wiper blade advantageously points toward an acute angle of the parallelogram that is closer to the wind deflector element. Particularly advantageously, for a mounting element having two wiper blade receptacle openings, in the assembled state the wiper lips of two mounted wiper blades face one another and/or lie on a straight line which connects the vertices of two opposite acute angles of the parallelogram. On account thereof, a wiper lip and/or wiper lips can be advantageously shielded from the outside, and/or be protected from shocks and/or damage and/or bending.

In one preferred design embodiment of the invention it is proposed that the wiper blade packaging device has at least one further mounting element that is configured so as to be separate from the mounting element, said further mounting element in the packaged state being disposed in the secondary packaging and being provided for at least partially mounting the wiper blade. When viewed along the direction of main extent of the wiper blade, the mounting element in the packaged state is advantageously disposed in a forward half, particularly advantageously in a forward third, preferably in a forward quarter, particularly preferably in a forward fifth of the wiper blade, and/or the further mounting element is advantageously disposed in a rearward half, particularly advantageously in a rearward third, preferably in a rearward quarter, particularly preferably in a rearward fifth of the wiper blade. The mounting element and the further mounting element are preferably provided for at least partially stretching the wiper blade in the packaged state. On account thereof, a wiper blade can be advantageously held securely along the entire length thereof. Furthermore, a wiper blade can be packaged in a space-saving manner on account thereof.

In one particularly preferred design embodiment of the invention it is proposed that the further mounting element is configured so as to be at least substantially identical to the mounting element. "At least substantially identical" objects in this context is to be understood in particular as meaning that the objects are constructed in such a manner that they can in each case fulfil a common function and in terms of the construction thereof, apart from production tolerances, differ at most by way of individual elements which are irrelevant to the common function. Apart from production tolerances and/or in the context of possibilities in terms of production technology, the mounting element and the further mounting element are advantageously configured so as to be identical. On account thereof, a complexity can be advantageously reduced. Furthermore, a packaging that is cost-effective and/or simple to manufacture can be advantageously provided on account thereof.

Moreover, a wiper blade packaging having a wiper blade packaging device is proposed. The wiper blade packaging advantageously has a packaging film which encloses the secondary packaging, in particular in an airtight manner. The wiper blade packaging particularly advantageously has at least one hook element which is provided for hanging up, in particular on a product shelf.

Furthermore proposed is a product having at least one wiper blade packaging device and having the wiper blade packaged in the wiper blade packaging device. The product advantageously has at least two, in particular exactly two, wiper blades that are packaged in the wiper blade packaging device.

Moreover, a method for producing the product is proposed, wherein in a first step the mounting element is pushed over the wiper blade, and in a second step the wiper blade having the mounting element pushed thereover is inserted into the secondary packaging. The mounting element is advantageously pushed over the wiper blade so as to be at least substantially parallel with the direction of main extent of the wiper blade. Particularly advantageously, the wiper blade having the mounting element pushed thereover is pushed into the secondary packaging so as to be at least substantially parallel with the direction of main extent of the secondary packaging. In particular in the case of two mounting elements being used, the two mounting elements are pushed over the wiper blade in opposite directions. Simple and rapid packaging can be advantageously enabled on account thereof. In particular, canting during insertion is advantageously avoided. Furthermore, a time-saving and cost-saving production can be advantageously be enabled.

The wiper blade packaging device according to the invention herein is not to be limited to the application and embodiment described above. In particular, the wiper blade packaging device according to the invention for fulfilling a functional mode described herein can have a number of individual elements, components, and units that deviates from a number mentioned herein.

BRIEF DESCRIPTION OF THE DRAWINGS

Further advantages are derived from the following description of the drawings. Two exemplary embodiments of the invention are illustrated in the drawings. The drawings, the description, and the claims contain numerous features in combination. A person skilled in the art will expediently also consider the features individually and combine the latter so as to form further expedient combinations.

In the drawings.

DETAILED DESCRIPTION

Figure 1:
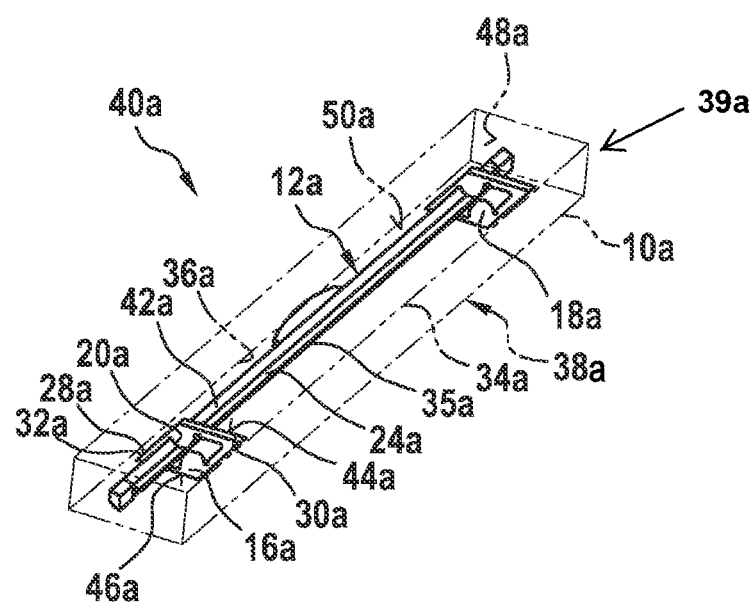
FIG. 1 shows a product having a wiper blade packaging device and a wiper blade, in a perspective illustration.

FIG. 1 shows a product 40*a* having a wiper blade packaging 38*a* which has a wiper blade packaging device 39*a* and a wiper blade 12*a* which is packaged. In the present case, the wiper blade 12*a* is configured as a flat wiper blade for a passenger motor vehicle. The wiper blade packaging device 39*a* has a secondary packaging 10*a*. In the present case, the secondary packaging 10*a* is configured as a cuboid packaging cardboard. The secondary packaging 10*a* is configured in one piece. Moreover, a length of the secondary packaging 10*a* is adapted to a length of the wiper blade 12*a*. In the present case, a length of the secondary packaging 10*a* is approximately 650 mm. The secondary packaging can have a viewing clearance and/or a viewing window, the latter in particular being covered by a transparent film. The wiper blade packaging device 39a furthermore has a first mounting element 16a which is provided for mounting the wiper blade 12a. The mounting element 16a is disposed in the secondary packaging 10a. In the present case, the mounting element 16a is configured in one piece. Furthermore, the mounting element 16a in the present case is configured from a rigid plastic material. Moreover, the mounting element 16a in the present case is produced by an injection moulding method. The wiper blade 12a penetrates the mounting element 16a. In the present case, the wiper blade 12a penetrates the mounting element 16a in a direction that is parallel with a direction of main extent of the wiper blade 12a.

The mounting element 16a has a wiper blade receptacle opening 20a which receives the wiper blade 12a. In the present case, the wiper blade 12a penetrates the mounting element 16a through the wiper blade receptacle opening 20a. The wiper blade 12a has a wind deflector element 42a. The wind deflector element 42a in the region of the wiper blade receptacle opening 20a is connected in a partially form-fitting manner to the mounting element 16a. The wiper blade receptacle opening 20a is provided for receiving the wiper blade 12a in such a manner that a wiper lip 24a of the wiper blade 12a is held in a non-contacting manner. A bearing side 35a of the wiper lip 24a points in the direction of an interior of the secondary packaging 10a.

The mounting element 16a in a packaged state has an extent along a direction of main extent of the secondary packaging 10a that corresponds to approximately 2% of an extent of the secondary packaging 10a along the direction of main extent of the secondary packaging 10a. The mounting element 16a, when viewed along the direction of main extent of the wiper blade 12a, is disposed in forward fifth of the wiper blade 12a.

Figure 2:
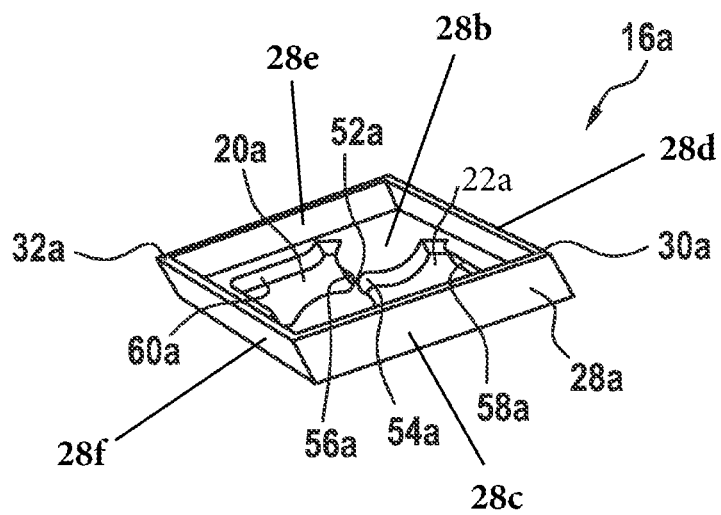
FIG. 2 shows a mounting element of the wiper blade packaging device in a perspective illustration.

The mounting element 16a has an external contour 28a which configures a parallelogram that is different from a rectangle (cf. also FIG. 2). The external contour 28a extends around a base wall 28b of the mounting element 16a and is defined by a first sidewall 28c extending away from the base wall 28b, a second sidewall 28d extending away from the base wall 28b, a third sidewall 28e extending away from the base wall 28b, and a fourth sidewall 28f extending away from the base wall 28b. The parallelogram has two acute angles 30a, 32a. In the present case, the two acute angles 30a, 32a are in each case approximately 120°. In the packaged state, each of the acute angles 30a, 32a contacts in each case one of two diagonally opposite internal edges 34a, 36a of the secondary packaging 10a. In each case one lateral face 44a, 46a of the mounting element 16a is connected in a form-fitting manner to an internal side 48a, 50a of the secondary packaging 10a.

The wiper blade packaging device 39a has a further mounting element 18a. The further mounting element 18a is disposed in the secondary packaging 10a. The wiper blade 12a in the packaged state is mounted by the mounting element 16a and the further mounting element 18a. The further mounting element 18a is configured so as to be identical to the mounting element 16a. The further mounting element 18a, when viewed along the direction of main extent of the wiper blade 12a, is disposed in a rearward fifth of the wiper blade 12a.

FIG. 2 shows the mounting element 16a in a perspective illustration. The mounting element 16a is illustrated when viewed from an upper side. The mounting element 16a is constructed symmetrically in such a manner that a view from a lower side, rotated by 180°, corresponds to the view from the upper side shown in FIG. 2. The mounting element 16a defines the first wiper blade receptacle opening 20a. The mounting element 16a furthermore defines a second wiper blade receptacle opening 22a. The first wiper blade receptacle opening 20a and the second wiper blade receptacle opening 22a each extend entirely through the base wall 28b and are configured so as to be symmetrical to one another in terms of points in relation to a symmetry center 52a. In the present case, the symmetry center 52a is in a center of gravity of the mounting element 16a. The wiper blade receptacle openings 20a, 22a are provided for at least partially receiving in each case one wiper blade. In the present case, only the wiper blade 12a is pushed into the first wiper blade receptacle opening 20a (cf. FIG. 1, not shown in FIG. 2).

The wiper blade receptacle openings 20a, 22a have in each case one wiper lip region 54a, 56a which is provided for receiving a wiper lip of a wiper blade. The wiper lip herein can be mounted in a non-contacting manner. The wiper lip regions 54a, 56a in each case face away from one of the two acute angles 30a, 32a of the external contour 28a of the mounting element 16a. In the packaged state, the wiper blade 12a is mounted by the mounting element 16a in such a manner that the bearing side 35a of the wiper lip 24a points away from an acute angle 32a of the external contour 28a that is closer to the wiper lip 24a. The wiper blade receptacle openings 20a, 22a furthermore have in each case one wind deflector region 58a, 60a which is provided for receiving a wind deflector element of a wiper blade. The wind deflector regions 58a, 60a face in each case a closer of the two acute angles 30a, 32a.

Figure 3:
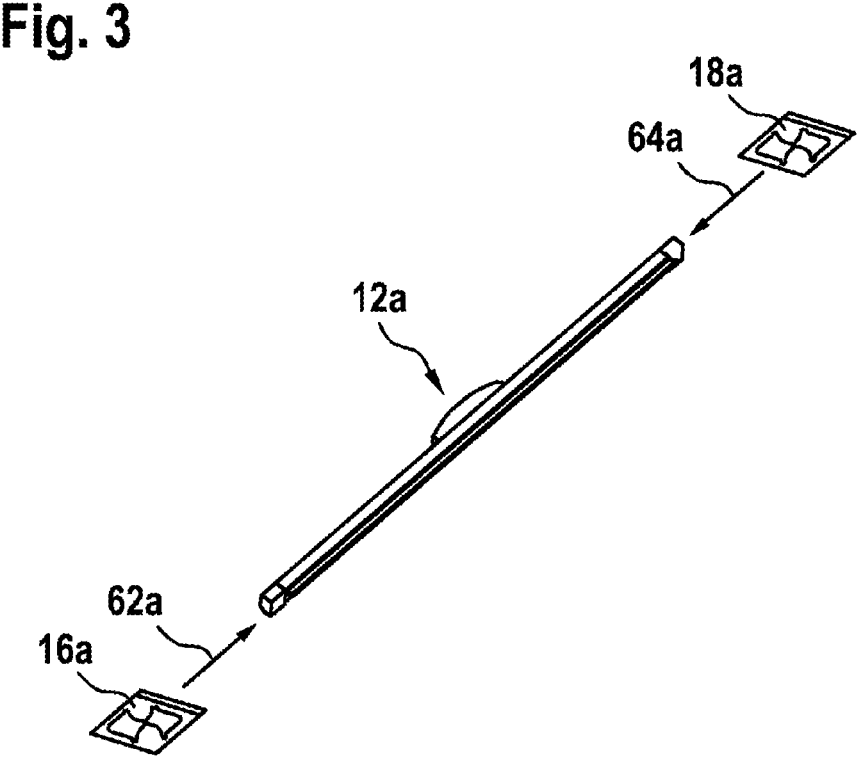
FIG. 3 shows the wiper blade of the product prior to the mounting elements of the wiper blade packaging divide being pushed thereonto, in a perspective illustration.

FIG. 3 shows the wiper blade 12a, the mounting element 16a, and the further mounting element 18a during a first method step of a method for producing the product 40a, in a perspective illustration. The mounting element 16a and the further mounting element 18a are pushed over the wiper blade 12a in opposite directions 62a, 64a along a direction of main extent of the wiper blade 12a.

Figure 4:
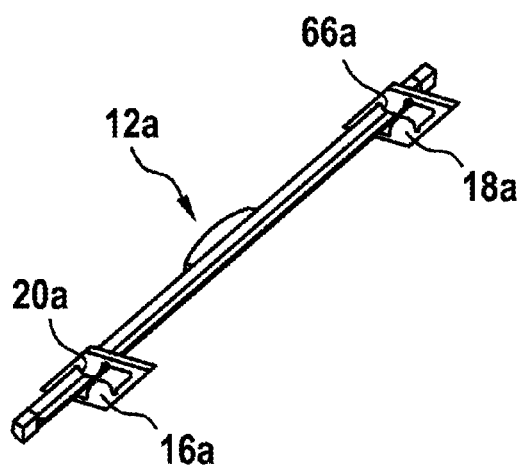
FIG. 4 shows the wiper blade having mounting elements pushed thereonto, in a perspective illustration.

FIG. 4 shows the wiper blade 12a, the mounting element 16a, and the further mounting element 18a after the first method step of the method for producing the product 40a, in a perspective illustration. The mounting element 16a and the further mounting element 18a have been pushed over the wiper blade 12a. The wiper blade 12a penetrates the first wiper blade receptacle opening 20a of the mounting element 16a and a first wiper blade receptacle opening 66a of the further mounting element 18a.

Figure 5:
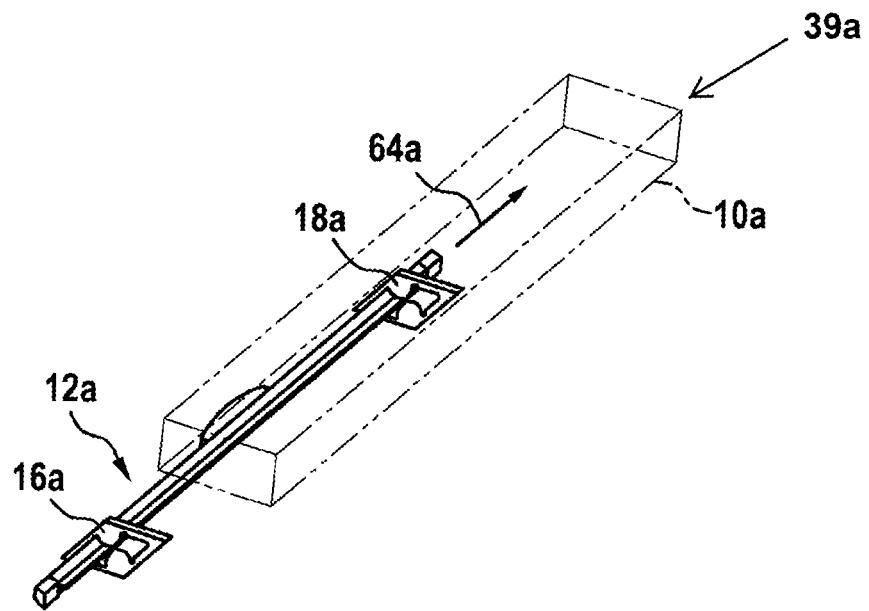
FIG. 5 shows the wiper blade having mounting elements pushed thereonto during an insertion into a secondary packaging of the product, in a perspective illustration.

FIG. 5 shows the wiper blade 12a, the mounting element 16a, and the further mounting element 18a during a second method step of the method for producing the product 40a, in a perspective illustration. The wiper blade 12a having the two mounting elements 16a, 18a pushed thereonto is pushed into the secondary packaging 10a of the wiper blade packaging device 39a. The wiper blade 12a having the two mounting elements 16a, 18a pushed thereonto is pushed in a direction 68a which runs parallel with a direction of main extent of the secondary packaging 10a.

Figure 6:
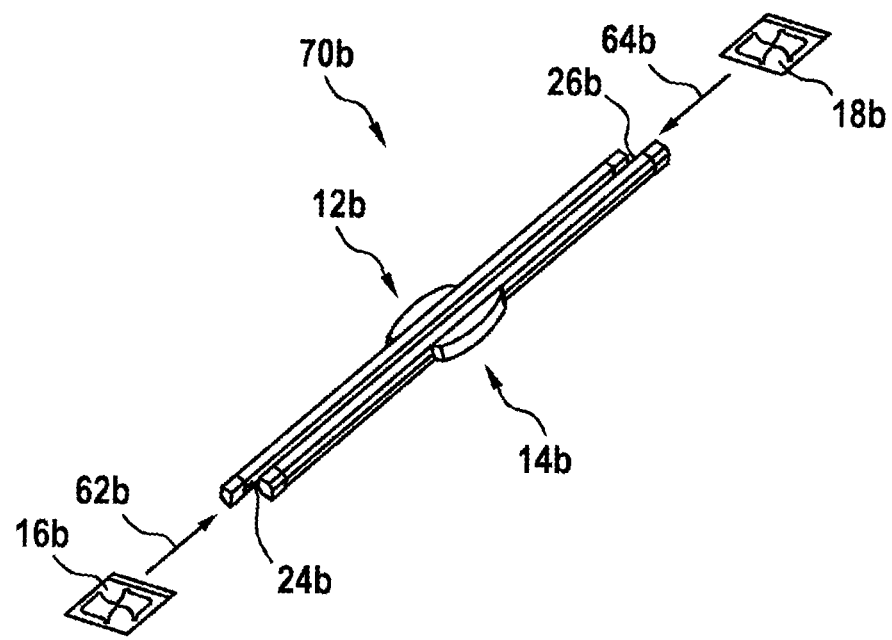
FIG. 6 shows two wiper blades of a further product prior to mounting elements of a further wiper blade packaging device being pushed thereonto, in a perspective illustration.
Figure 7:
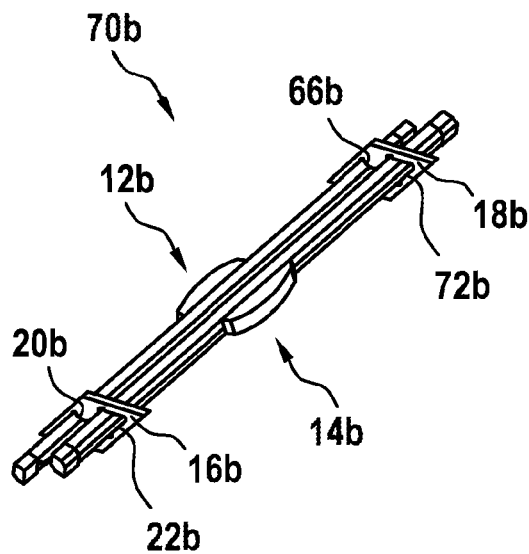
FIG. 7 shows the two wiper blades with mounting elements pushed thereonto, in a perspective illustration.
Figure 8:
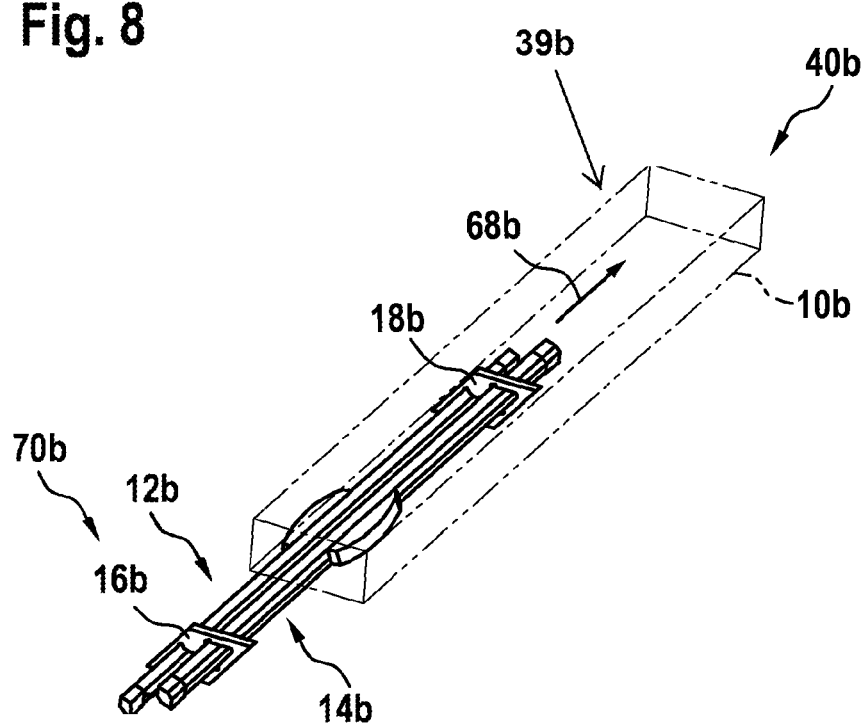
FIG. 8 shows the two wiper blades having mounting elements pushed thereonto during an insertion into a secondary packaging of the further product, in a perspective illustration.

A further exemplary embodiment of the invention is shown in FIGS. 6 to 8. The descriptions hereunder are substantially limited to the differences between the exemplary embodiments, wherein reference can be made to the description of the exemplary embodiment of FIGS. 1 to 5 in terms of components, features, and functions that remain the same. In order for the exemplary embodiments to be differentiated, the letter a in the reference signs of the exemplary embodiment in FIGS. 1 to 5 has been replaced by the letter b in the reference signs of the exemplary embodiment of FIGS. 6 to 8. In principle, reference can also be made to the drawings and/or the description of the exemplary embodiment of FIGS. 1 to 5 in terms of identically identified components, in particular in terms of components having the same reference signs.

FIG. 6 shows a precursor product 70b of a further product 40b (cf. FIG. 8) during a first method step, in a perspective illustration. The precursor product 70b has a first wiper blade 12b and a second wiper blade 14b, each having one wiper lip 24b, 26b. The wiper lips 24b, 26b of the two wiper blades 12b, 14b face one another. A direction of main extent of the first wiper blade 12b runs parallel with a direction of main extent of the second wiper blade 14b. A mounting element 16b and a further mounting element 18b are pushed over the first wiper blade 12b and the second wiper blade 14b in opposite directions 62b, 64b along a direction of main extent of the first wiper blade 12b.

FIG. 7 shows the precursor product 70b after the first method step of the method for producing the further product 40b, in a perspective illustration. The mounting element 16b and the further mounting element 18b have been pushed over the first wiper blade 12b and the second wiper blade 14b. The first wiper blade 12b penetrates a first wiper blade receptacle opening 20b of the mounting element 16b and a first wiper blade receptacle opening 66b of the further mounting element 18b. The second wiper blade 14b penetrates a second wiper blade receptacle opening 22b of the mounting element 16b and a second wiper blade receptacle opening 72b of the further mounting element 18b.

FIG. 8 shows the precursor product 70b during a second method step of the method for producing the further product 40b, in a perspective illustration. The first wiper blade 12b and the second wiper blade 14b having the two mounting element 16b, 18b pushed thereonto are pushed into a secondary packaging 10b of a further wiper blade packaging device 39b. The first wiper blade 12b and the second wiper blade 14b having the two mounting elements 16b, 18b pushed thereonto are pushed along a direction 68b which runs parallel with a direction of main extent of the secondary packaging 10b. After pushing-in has been fully accomplished, the product 40b can be completed.

What is claimed is:

1. A wiper blade packaging device (39a; 39b) comprising:
a secondary packaging (10a; 10b) which is configured for receiving a first wiper blade (12a; 12b) and a second wiper blade (12a; 12b); and
a mounting element (16a; 16b) configured to be disposed in the secondary packaging (10a; 10b), said mounting element (16a; 16b) being configured for at least partially mounting the first wiper blade (12a; 12b) and the second wiper blade (12a; 12b),
characterized in that the mounting element (16a; 16b) is configured so as to be penetrated by the first wiper blade (12a; 12b) and the second wiper blade (12a, 12b), wherein the mounting element (16a; 16b) defines a first wiper blade receptacle opening (20a; 20b) sized and shaped to receive the first wiper blade (12a; 12b), and a second wiper blade receptacle opening (22a; 22b) sized and shaped to receive the second wiper blade (12a; 12b), wherein the mounting element (16a; 16b) includes a base wall (28b), wherein the first wiper blade opening (20a; 20b) extends entirely through the base wall (28b) and the second wiper blade opening (22a; 22b) extends entirely through the base wall (28b), wherein the mounting element (16a; 16b) also includes a first sidewall (28c) extending away from the base wall (28b), a second sidewall (28d) extending away from the base wall (28b), a third sidewall (28e) extending away from the base wall (28b), and a fourth sidewall (28f) extending away from the base wall (28b), wherein the first sidewall (28c), the second sidewall (28d), the third sidewall (28e), and the fourth sidewall (28f) together define an external contour (28a) having a shape of a parallelogram that is different from a rectangle.

2. The wiper blade packaging device (39a; 39b) as claimed in claim 1, characterized in that the second wiper blade receptacle opening (22a; 22b) is symmetrical relative to the first wiper blade receptacle opening (20a; 20b) about a center of gravity (52a) of the mounting element (16a; 16b).

3. The wiper blade packaging device (39a; 39b) as claimed in claim 1, characterized in that the mounting element (16a; 16b) and the secondary packaging (10a; 10b) are sized and shaped such that the mounting element (16a; 16b) has an extent which corresponds to at most 20% of an extent of the secondary packaging (10a; 10b) along a direction of main extent of the secondary packaging (10a; 10b) when the mounting element (16a; 16b) is disposed within the secondary packaging (10a; 10b).

4. The wiper blade packaging device (39a; 39b) as claimed in claim 1, characterized in that the mounting element (16a; 16b) is configured to be disposed in an at least partially form-fitting manner in the secondary packaging (10a; 10b) when the mounting element is disposed within the secondary packaging (10a; 10b).

5. The wiper blade packaging device (39a; 39b) as claimed in claim 1, characterized in that the parallelogram has a first corner defining a first acute angle (30a) and a second corner defining second acute angle (32a), wherein the secondary packaging (10a; 10b) has a first internal edge (34a) and a diagonally opposite second internal edge (36a), wherein the mounting element (16a; 16b) is sized and shaped such that when the mounting element (16a; 16b) is disposed within the secondary packaging (10a; 10b), the first corner contacts the first internal edge (34a) and the second corner contacts the second internal edge (36a).

6. The wiper blade packaging device (39a; 39b) as claimed in claim 1, characterized by a further mounting element (18a; 18b) that is configured so as to be separate from the mounting element (16a; 16b), said further mounting element (18a; 18b) configured to be disposed in the secondary packaging (10a; 10b) and being configured for at least partially mounting the first wiper blade (12a; 12b) and the second wiper blade (12a; 12b).

7. The wiper blade packaging device (39a; 39b) as claimed in claim 6, characterized in that the further mounting element (18a; 18b) is substantially identical to the mounting element (16a; 16b).

8. The wiper blade packaging device (39a; 39b) as claimed in claim 1, wherein the first wiper blade receptacle opening (20a; 20b) and the second wiper blade receptacle opening (22a; 22b) have equivalent sizes and shapes, and wherein the first wiper blade receptacle opening (20a; 20b) and the second wiper blade receptacle opening (22a; 22b) are sized and shaped such that when the first wiper blade (12a; 12b) is inserted into the first wiper blade receptacle opening (22a; 22b) and the second wiper blade (14b) is inserted into the second wiper blade receptacle opening (22a; 22b), a wiper lip (24a) of the first wiper blade (12a; 12b) faces a wiper lip (24b) of the second wiper blade (14b).

9. The wiper blade packaging device (39a; 39b) as claimed in claim 1, wherein the first wiper blade opening (20a; 20b) includes a wiper lip region (56a) and a wind deflector region (60a) disposed opposite the wiper lip region (56a).

10. The wiper blade packaging device (39*a*; 39*b*) as claimed in claim 9, wherein the wind deflector region (60) is sized and shaped so as to form a form fit with a portion of the first wiper blade (12*a*; 12*b*) when the first wiper blade (12*a*; 12*b*) extends through the first wiper blade opening (20*a*; 20*b*).

11. The wiper blade packaging device (39*a*; 39*b*) as claimed in claim 9, wherein the wiper lip region (56*a*) has a different shape than the wind deflector region (60*a*).

12. The wiper blade packaging device (39*a*; 39*b*) as claimed in claim 1, wherein the base wall (28*b*), the first sidewall (28*c*), the second sidewall (28*d*), the third sidewall (28*e*), and the fourth sidewall (28*f*) together define an interior volume located adjacent the first wiper blade opening (20*a*; 20*b*) and the second wiper blade opening (22*a*; 22*b*).

13. The wiper blade packaging device (39*a*; 39*b*) as claimed in claim 12, wherein the first sidewall (28*c*), the second sidewall (28*d*), the third sidewall (28*e*), and the fourth sidewall (28*f*) each extend perpendicularly away from the base wall (28*b*).

14. The wiper blade packaging device (39*a*; 39*b*) as claimed in claim 1, wherein the second wiper blade receptacle opening (22*a*; 22*b*) is symmetrical relative to the first wiper blade receptacle opening (20*a*; 20*b*) about a center of gravity (52*a*) of the mounting element (16*a*; 16*b*), wherein the center of gravity (52*a*) is located on the base wall (28*b*).

* * * * *